(12) United States Patent
Castelain (10) Patent No.: US 7,203,157 B2
(45) Date of Patent: Apr. 10, 2007

(54) EQUALIZATION METHOD AND DEVICE OF THE GMMSE TYPE (75) Inventor: Damien Castelain, Rennes (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1120 days.

(21) Appl. No.: 10/100,145

(22) Filed: Mar. 19, 2002

(65) Prior Publication Data

US 2002/0186650 A1 Dec. 12, 2002

(30) Foreign Application Priority Data

Mar. 22, 2001 (FR) ................................. 01 04049

(51) Int. Cl.
*H04J 11/00* (2006.01)
(52) U.S. Cl. ....................... 370/203; 370/342
(58) Field of Classification Search ..................... None
See application file for complete search history.

(56) References Cited

U.S. PATENT DOCUMENTS 5,912,876 A * 6/1999 H'mimy ................... 370/210

| | | | |
|---|---|---|---|
| 7,023,265 B1 * | 4/2006 | Helard et al. | 329/320 |
| 2002/0146078 A1 * | 10/2002 | Gorokhov et al. | 375/260 |
| 2002/0181549 A1 * | 12/2002 | Linnartz et al. | 375/142 |
| 2002/0181562 A1 * | 12/2002 | Castelain | 375/148 |
| 2002/0181625 A1 * | 12/2002 | Gorokhov et al. | 375/346 |
| 2003/0072291 A1 * | 4/2003 | Brunel | 370/342 |

\* cited by examiner

*Primary Examiner*—Huy D. Vu
*Assistant Examiner*—Daniel Ryman
(74) *Attorney, Agent, or Firm*—Oblon, Spivak, McClelland, Maier & Neustadt, P.C.

(57) ABSTRACT

Exemplary embodiments of the invention provide an equalization method for a downlink channel in a telecommunication system transmitting MC-CDMA symbols on a plurality of carrier frequencies, in which a plurality of links are established between a transmitter and a plurality of receivers in order to transmit a plurality of coded signals, each link using a distinct access code amongst N possible codes, the conjugate product of two possible codes being proportional to a possible code or to its conjugate, the method including, for at least one receiver, a step of calculating a matrix (B, B) characteristic of the plurality of links, the calculation step first of all calculating the elements of a row or a column in the characteristic matrix and deducing the other rows or the other columns by means of a permutation of the elements.

17 Claims, 7 Drawing Sheets

EQUALIZATION METHOD AND DEVICE OF THE GMMSE TYPE

BACKGROUND

The present invention concerns an equalisation method and device for the downlink channel of a telecommunications system of the MC-CDMA type. More particularly, the present invention concerns an equalisation method and device of the GMMSE type.

Multi-Carrier Code Division Multiple Access (MC-CDMA) combines OFDM (Orthogonal Frequency Division Multiplex) modulation and the CDMA multiple access technique. This multiple access technique was proposed for the first time by N. Yee et al. in the article entitled "Multicarrier CDMA in indoor wireless radio networks" which appeared in Proceedings of PIMRC'93, Vol. 1, pages 109–113, 1993. The developments of this technique were reviewed by S. Hara et al. in the article entitled "Overview of Multicarrier CDMA" published in IEEE Communication Magazine, pages 126–133, December 1997.

Unlike the DS-CDMA (Direct Sequence Code Division Multiple Access) method, in which the signal of each user is multiplied in the time domain in order to spread its frequency spectrum, the signature here multiplies the signal in the frequency domain, each element of the signature multiplying the signal of a different subcarrier.

Figure 1:
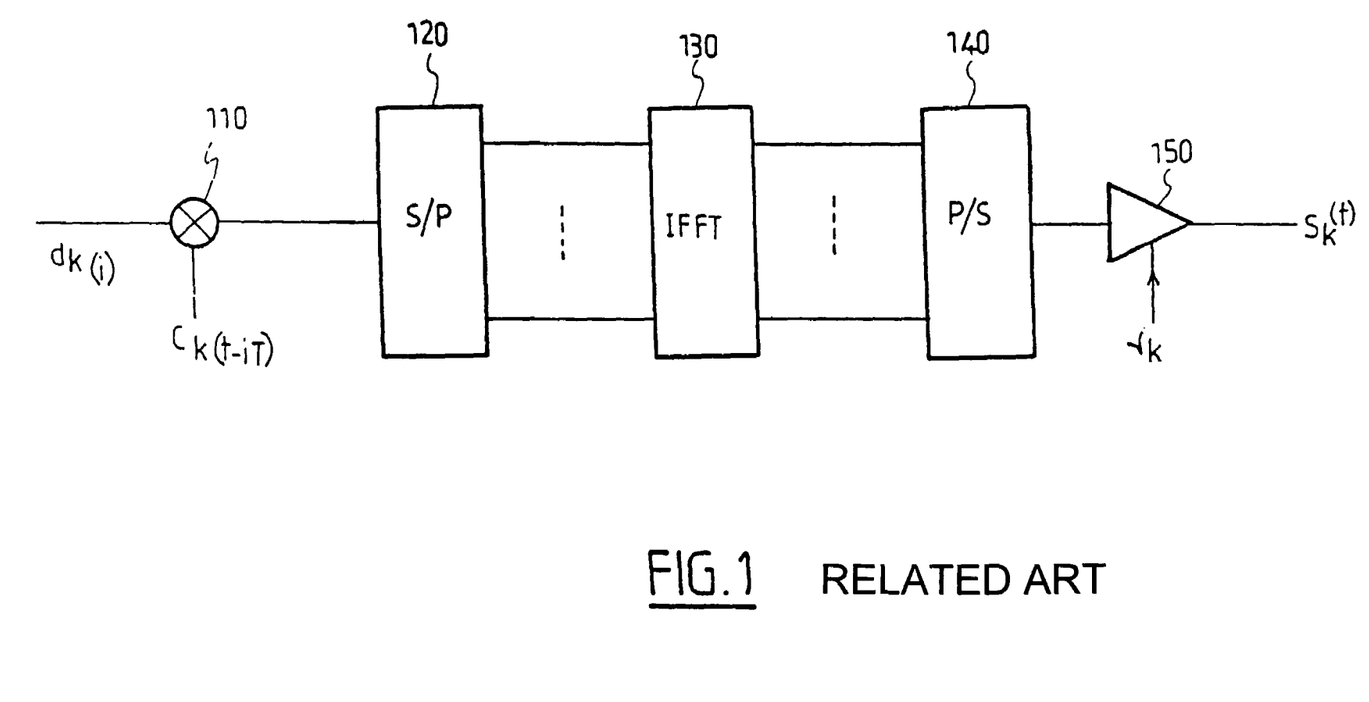
FIG. 1 depicts schematically the structure of an MC-CDMA transmitter known from the state of the art.

More precisely, FIG. 1 shows the structure of an MC-CDMA transmitter for a given user k. Let $d_k(t)$ be the $i^{th}$ symbol to be transmitted from the user k, where $d_k(i)$ belongs to the modulation alphabet. The symbol $d_k(i)$ is first of all multiplied at 110 by a spreading sequence or signature of the user, denoted $c_k(t)$, consisting of N "chips", each "chip" being of duration $T_c$, the total duration of the spreading sequence corresponding to a symbol period T. The results of the multiplication of the symbol $d_k(i)$ by the different "chips" are converted by the serial to parallel converter 120 into a block of L symbols, where L is in general a multiple of N. It will be considered, for reasons of simplification of presentation, that L=N. The block of L symbols is then subjected to an inverse fast Fourier transformation (IFFT) in the module 130 before being transmitted to the parallel to serial converter 140. In order to prevent intersymbol interference, a guard interval, with a length greater than the duration of the pulse-type response of the transmission channel, is added to the MC-CDMA symbol. This interval is obtained by the addition (not shown) of a suffix chosen so as to be identical to the start of the said symbol. The symbol thus obtained is amplified at 150 in order to be transmitted over the user channel. It can therefore be seen that the MC-CDMA method can be analysed into a spreading in the spectral domain (before IFFT) followed by an OFDM modulation.

In practice, a base station transmits the data for a user k in the form of frames of I symbols, each symbol $d_k(i)$ being spread by a real signature $c_k(t)$ with a duration equal to the symbol period T, such that $c_k(t)=0$ if $t \notin [0,T[$. The signal modulated at time $t=i.T+l.T_c$ can then be written, if the guard intervals between MC-CDMA symbols are omitted:

$$S_k(t) = \sum_{i=0}^{I-1} \sum_{l=0}^{L-1} v_k \cdot c_k(l.T_c) \cdot d_k(i) \cdot \exp(j \cdot 2\pi l/L) \quad (1)$$

where $v_k$ is the amplitude of the signal transmitted by the user k, assumed to be constant for a transmission unit.

Figure 2:
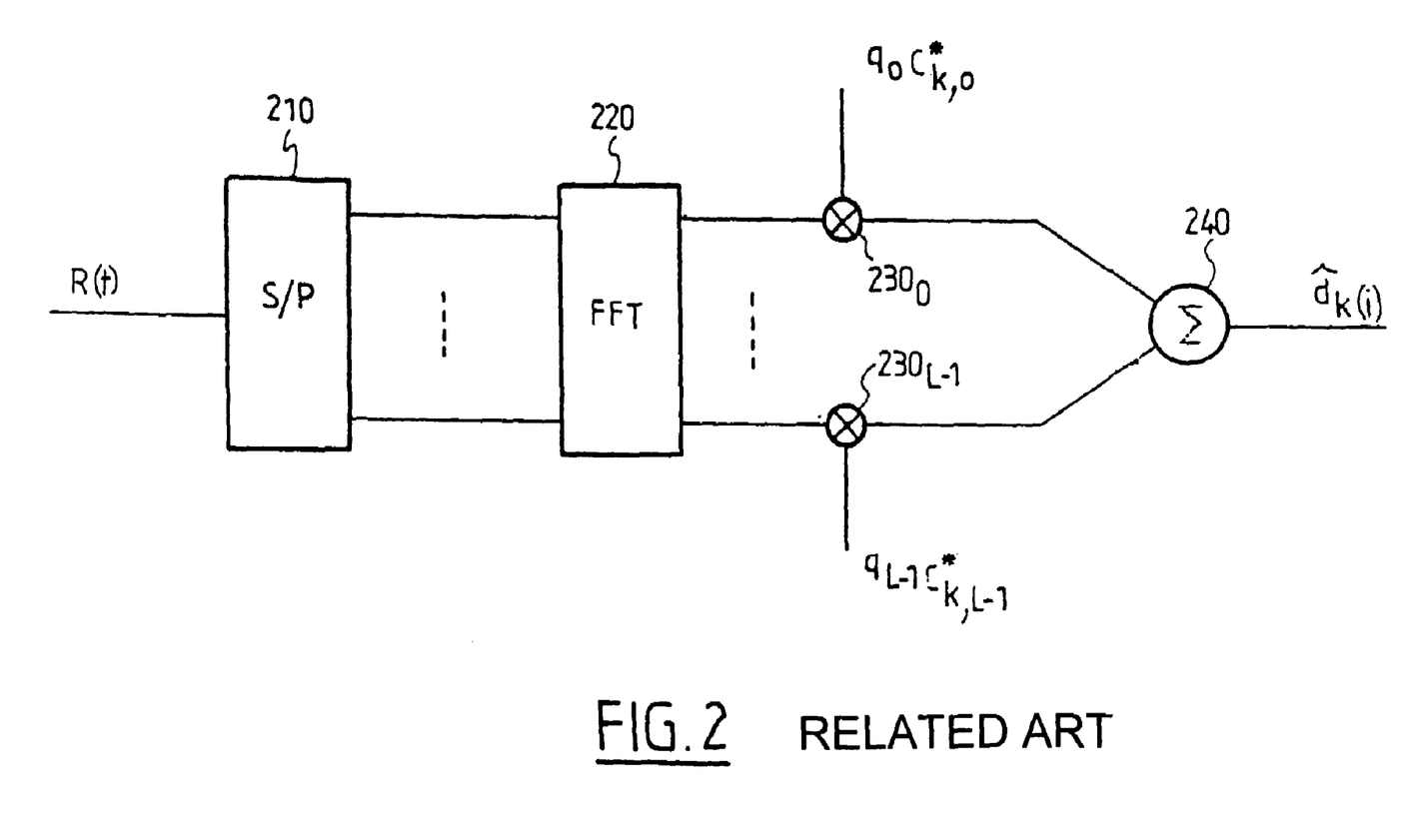
FIG. 2 depicts schematically the structure of a single user MC-CDMA receiver known from the state of the art.

An MC-CDMA receiver for a given user k has been illustrated schematically in FIG. 2.

The demodulated received signal is sampled at the "chip" frequency and the samples belonging to the guard interval are eliminated (elimination not shown). The signal obtained can be written:

$$R(t) = \sum_{k=0}^{K-1} \sum_{i=0}^{I-1} \sum_{l=0}^{L-1} h_{kl}(i) \cdot v_k \cdot c_{kl} \cdot d_k(i) \cdot \exp(j \cdot 2\pi l/L) + b(t) \quad (2)$$

where K is the number of users, $c_{kl}=c_k(l.T_c)$, $h_{kl}(i)$ represents the response of the channel of the user k to the frequency of the subcarrier l of the MC-CDMA symbol transmitted at time i.T and where b(t) is the received noise.

If the downlink channel is considered, the transmission channels have identical characteristics and it is possible to write $h_{kl}=h_l$. The study will be limited hereinafter to the downlink channel.

The samples obtained by sampling at the "chip" frequency are put in parallel in a serial to parallel converter 210 before undergoing an FFT in the module 220. The samples in the frequency domain, output from 220, are equalised and despread by the signature of the user k. To do this, the samples of the frequency domain are multiplied by the coefficients $q_l \cdot c_{kl}^*$ in the multipliers $230_0, \ldots, 230_{L-1}$, and then added at 240 in order to supply as an output an estimated symbol $\hat{d}_k(i)$.

Different possibilities of equalisation have been envisaged in the state of the art:

MRC (Maximum Ratio Combining) defined by the use of the coefficients $q_l = h_l^*$ where .* denotes the complex conjugate;

EGC (Equal Gain Combining) defined by the use of the coefficients $q_l = e^{-j\Phi_l}$ where $h_l = \rho_l \cdot e^{j\Phi_l}$;

ZF (Zero Forcing) where $q_l = h_l^{-1}(i)$;

zero forcing ZF with threshold (Th) where $q_l = h_l^{-1}(i)$ if $|h_l(i)|<Th$ and $q_l = 0$ (or $q_l = e^{-j\Phi_l}$) otherwise;

the Minimum Mean Square Error (MMSE) algorithm for minimising the mean square error on each of the carriers:

$$q_l = \frac{h_l^*}{|h_l|^2 + \sigma^2}$$

where $\sigma^2$ is the variance of the noise on the carrier.

In MC-CDMA, the presence of a guard period makes it possible to disregard the intersymbol interference. The equalisation can therefore be simply effected by means of a simple multiplication by a complex coefficient, carrier by carrier.

The receiver illustrated in FIG. 2 decodes the data of a user k without taking account of the interference due to the other users. For this reason it is known as single user or SU.

The multiuser detection techniques are known notably in CDMA telecommunications systems. They have the common characteristic of taking account of the interference generated by the other users.

A multiuser detection or MUD technique for MC-CDMA was presented in the article by J-Y. Beaudais, J. F. Hélard and J. Citeme entitled "A novel linear MMSE detection technique for MC-CDMA" published in Electronics Letters, Vol. 36, N°7, pages 665–666, 30 Mar. 2000. The equalisation method proposed no longer operates carrier by carrier but MC-CDMA symbol by MC-CDMA symbol, taking account of all the carriers. For this reason it is called GMMSE (Global Minimum Mean Square Error) equalisation or, equivalently, M-MMSE (Matrix Minimum Mean Square Error) equalisation. Its purpose is to minimise the mean square error between the estimated symbols $\hat{d}_k(i)$ and the transmitted symbols $d_k(i)$.

Figure 3:
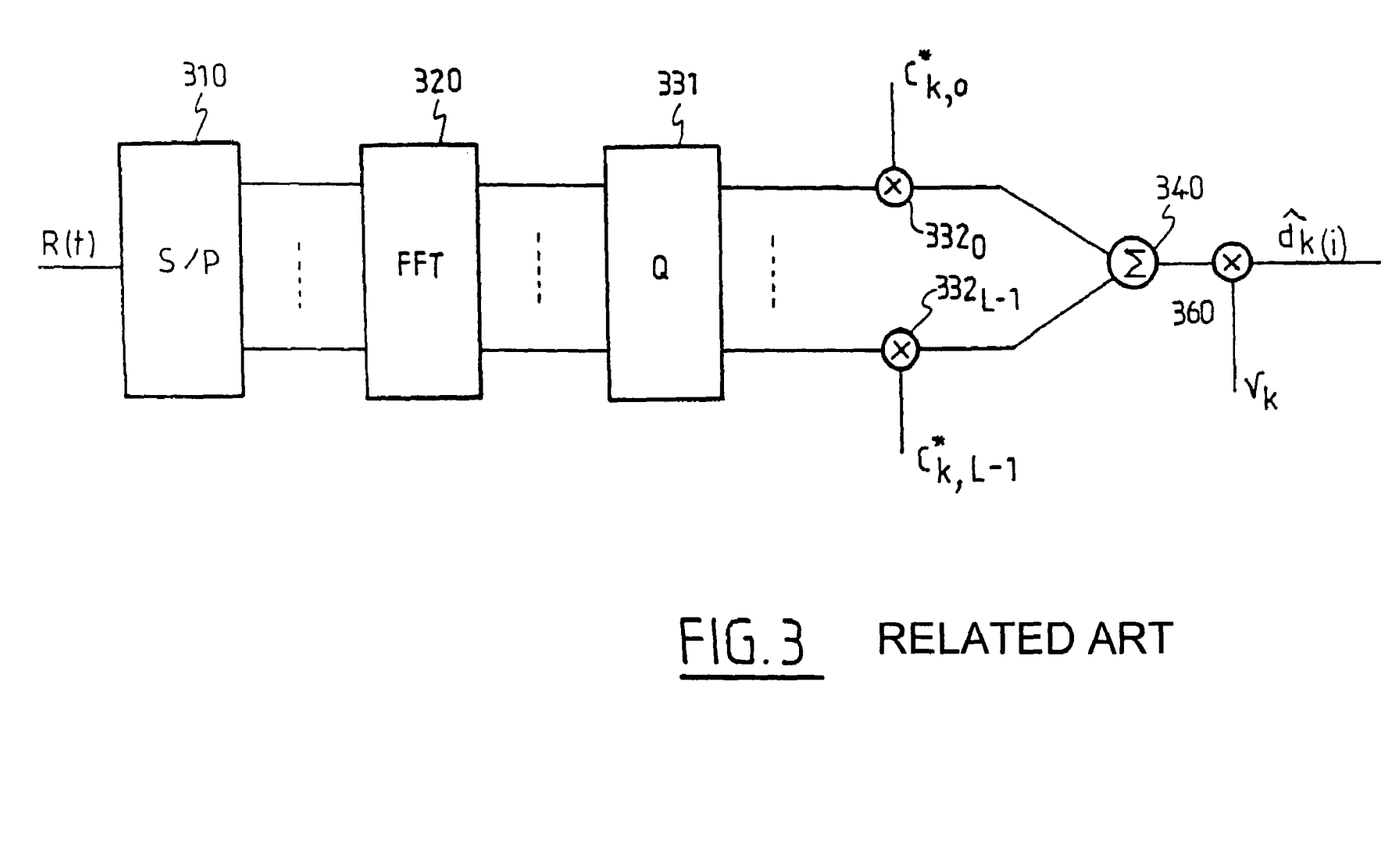
FIG. 3 depicts schematically the structure of an MC-CDMA receiver using a GMMSE equalisation, known from the state of the art.

An MC-CDMA receiver with GMMSE equalization for a user k (also referred to in this case as per user MMSE) has been shown in FIG. 3. It differs from that of FIG. 2 in that the equalization is effected by means of a multiplication 331 by a matrix Q of the signals of the different carriers. The modules 310, 320 can be seen, identical to the modules 210 and 220 on FIG. 2. After the matrix multiplication 331, the samples are despread by the signature of user k. To do this, the samples of the frequency domain are multiplied by the coefficients $c_{k,l}^*$ in the multipliers $332_0, \ldots, 332_{L-1}$ and then added at 340. The despread signal obtained at the output of the adder 340 is then multiplied at 360 by the transmission level $v_k$ of the user κ in question in order to supply an estimated symbol $\hat{d}_k(i)$.

As shown in the aforementioned article, the matrix Q can be obtained by applying the Wiener filtering theory, in the form:

$$Q = H^H (AA^H + \sigma_b^2 . I_N)^{-1} \quad (3)$$

with A=HCV where H is the diagonal matrix N×N representing the frequency response of the channel to the different subcarriers, C is the matrix N×N whose columns are the code sequences of the different users (which will hereinafter simply be referred to as "codes"), V is the diagonal matrix N×N whose elements $v_i$ are the transmission levels of the different users, $\sigma_b^2$ is the variance of the noise and $I_N$ is the identity matrix of size N×N. The symbol $.^H$ designates the conjugate transpose. It should be noted that, in general, matrix inversion is not carried out but the corresponding system of linear equations is resolved.

As indicated by (3), the equalisation operation depends on the calculation of the matrix $AA^H$ and the inversion of the matrix $AA^H + \sigma_b^2 . I_N$ (or equivalently the resolution of a linear system of rank N). These calculations consume resources of the mobile terminal, all the more so if they have to be performed frequently, notably in the case of rapid variations on the transmission channel. However, it is known that the resources of the terminals constitute precisely the critical part of a mobile telecommunication system.

SUMMARY

The problem at the basis of the present invention is to propose a GMMSE equalisation method for a downlink channel of an MC-CDMA telecommunication system which does not use significant calculation resources.

The problem is resolved by the invention, defined, as an equalisation method for a downlink channel in a telecommunication system transmitting MC-CDMA symbols on a plurality of carrier frequencies, in which a plurality of links are established between a transmitter and a plurality of receivers in order to transmit a plurality of coded signals, each link using a distinct access code amongst N possible codes, the conjugate product of two possible codes being proportional to a possible code or to its conjugate, the said method comprising, for at least one receiver, a step of calculating a matrix (B, E) characteristic of the said plurality of links, the said calculation step first of all calculating the elements of a row or a column in the characteristic matrix and deducing the other rows or the other columns by means of a permutation of the said elements.

According to a first embodiment, the characteristic matrix is the product $E = C|V|^2 C^H$ where C is the matrix of the possible codes, $C^H$ is the conjugate transpose of C, V=Diag$(v_0, \ldots, v_{N-1})$ where the coefficients $v_i$ are the transmission levels, real or estimated, of the signals coded by means of the said N possible codes.

Advantageously, it comprises a second step of calculating the matrix $\Lambda = HEH^H + \sigma_b^2 . I_N$ where $I_N$ is the unity matrix of size N×N, $\sigma_b^2$ is the variance of the noise, H=Diag$(h_0, \ldots, h_{N-1})$ and where the coefficients hi characterise the response of the transmission channel, between the said transmitter and the said receiver, at the different carrier frequencies. Advantageously too, it comprises a third step of calculating $\hat{D} = A^H \Lambda^{-1} Y$ where $\hat{D}$ is the vector of the estimated symbols on the different links, A=HCV, Y is the received vector of the components of an MC-CDMA symbol on the different carrier frequencies.

According to a second embodiment, the characteristic matrix is the product $B = C^H |H|^2 C$ where C is the matrix of the possible codes, $C^H$ is the conjugate transpose of C, H=Diag$(h_0, \ldots, h_{N-1})$ where the coefficients $h_i$ characterise the response of the channel, between the said transmitter and the said receiver, at the different carrier frequencies.

Advantageously, it comprises a second step of calculating the matrix $\Omega = V^H B V + \sigma_b^2 . I_N$ where $I_N$ is the unity matrix of size N×N, $\sigma_b^2$ is the variance of the noise, V=Diag$(v_0, \ldots, v_{N-1})$ where the coefficients $v_i$ are the transmission levels, real or estimated, of the signals coded by means of the said N possible codes. Advantageously too, it comprises a third step of resolving a system of linear equations $\Omega \hat{D} = A^H Y$ where A=HCV, Y is the received vector of the components of an MC-CDMA symbol on the different carrier frequencies and where $\hat{D}$ is the vector of the estimated symbols on the different links.

According to a variant, from the transmission levels, real or estimated, of the signals coded by means of the said N possible codes, a subset of codes will be selected amongst the N possible codes. In this case, P codes amongst N having been selected, the matrix V=Diag$(v_0, \ldots, v_{N-1})$, where the $v_i$ values are the estimated or real levels, can be reduced to a matrix V' of size P×P now containing only the levels associated with the said selected codes and the step of calculation of the characteristic matrix will be followed by a second step of calculating the matrix $\Omega' = V'^H B' V' + \sigma_b^2 . I_P$ where B' is a matrix of size P×P obtained by reducing B to the P rows and P columns corresponding to the codes selected, $\sigma_b^2$ is the variance of the noise on each carrier and $I_P$ the unity matrix of size P×P.

Advantageously, there will be effected an equalisation of the MC-CDMA symbols over the different carrier frequencies followed by a filtering adapted to each of the N possible codes. The transmission levels of the signals coded by means of the said N possible codes will then be estimated by effecting a modulus calculation at the output of the said adapted filtering.

In this case the equalisation methods can provide for a third step of resolving a system of linear equations $\Omega' \hat{D}' = V'^H Z'$ where Z' is the reduction of a vector Z to the P components corresponding to the selected codes, where Z is the result of the carrier by carrier equalisation and where $\hat{D}'$ is the vector of the estimated symbols on the different links using the said selected codes.

The matrix C of the possible codes can be chosen such that its elements $c_{k,i}$ satisfy an equation of the type $c_{k,i}^* c_{k,j} = \lambda_{ij} \cdot c_{k,f(i,j)}$ or $\lambda_{ij} \cdot c_{k,f(i,j)}^*$ where f(i,j) is an index between 0 and N−1 dependent on i and j and $\lambda_{ij}$ is a complex number. If the matrix C of the possible codes is a matrix of a Hadamard or rotated Hadamard code, a row or a column of the characteristic matrix will be calculated by means of a Hadamard transform. Likewise, if the matrix C of the possible codes is a matrix of a Fourier or rotated Fourier code, a row or a column of the characteristic matrix will be calculated by means of an FFT.

The present invention is also defined by an equalisation device for a receiver in a telecommunication system of the MC-CDMA type, comprising means for implementing the equalisation method as disclosed above.

Finally, the present invention concerns a receiver for a telecommunication system of the MC-CDMA type, characterised in that it comprises such an equalisation device.

BRIEF DESCRIPTION OF THE DRAWINGS

The characteristics of the invention mentioned above, as well as others, will emerge more clearly from a reading of the following description given in relation to the accompanying figures, amongst which.

DETAILED DESCRIPTION OF THE PREFERRED EMBODIMENTS

Once again the context of an MC-CDMA system using a GMMSE equalisation method will be referred to. The MC-CDMA signal after the FFT step (that is to say the signal output from the module 320 of FIG. 3) can be written in the form of a vector Y of dimension N whose components correspond to the different carriers. Taking the above notations again (but omitting, for reasons of simplification, the time index i), it is possible to express Y as a function of the vector D of the symbols $d_k$ transmitted to the different users:

$$Y = HCVD + b = AD + b \qquad (4)$$

where A=HCV and where b is the vector of the noise components.

More precisely, $D = (d_0, \ldots, d_{N-1})^T$ represents the vector of the symbols transmitted to the different users. The diagonal matrix $V = \mathrm{Diag}(v_0, \ldots, v_{N-1})$ represents the transmission levels. The matrix C is the matrix of the N possible codes. More precisely, the $i^{th}$ column of C corresponds to the sequence of the $i^{th}$ code. For example, this matrix can be a Walsh-Hadamard matrix, for which a fast transform algorithm exists. The diagonal matrix H represents the frequency response of the channel compared to the different subcarriers, that is to say $H = \mathrm{Diag}(h_0, h_1, \ldots, h_{N-1})$. It will be assumed hereinafter that this matrix is known. Techniques exist for estimating the frequency response matrix, for example relying on the insertion of reference pilots, as described in the French application N° 0011834 filed on 14.9.00 in the name of the applicant and included here by reference.

On reception the vector Y is the subject of the GMMSE equalisation by the matrix Q given by (3). If $\hat{D}$ is the vector of the symbols estimated for the different users, obtained by despreading:

$$\hat{D} = V^H C^H Q Y = A^H (AA^H + \sigma_b^2 . I_N)^{-1} Y \qquad (5)$$

it can be shown (see annexe) that expression (5) is equivalent to:

$$\hat{D} = (A^H A + \sigma_b^2 . I_N)^{-1} A^H Y \qquad (6)$$

As will be seen later, it is possible to estimate the different transmission levels and therefore the matrix V. Knowing the frequency response matrix H and the matrix of the code C, it is possible to derive A (and $A^H$) therefrom and, by means of formula (5) or (6), to obtain $\hat{D}$.

The variance of the noise $\sigma_b^2$ can for its part be evaluated conventionally, by means of pilot signals used for estimating the transmission channel. It is also possible to use a "typical" mean value.

The matrix $A^H A$ in (6) can be rewritten in the form $$A^H A = V^H (C^H H^H H C) V = V^H (C^H |H|^2 C) V \qquad (7)$$

Likewise, the matrix $AA^H$ in (5) can be written in the form:

$$AA^H = HCVV^H C^H H^H = H(C|V|^2 C^H) H^H \qquad (8)$$

The general idea of the invention is that, for the majority of the codes currently used, the calculation of the matrix $B = C^H |H|^2 C$ in (7) or of the matrix $E = C|V|^2 C^H$ in (8) can be considerably simplified.

Assume first of all that the code used is a Walsh-Hadamard (WM) code. It will be recalled that the WH code can be generated like the columns of a matrix $C_{2p}$ obtained by recurrence:

$$C_{2p} = \begin{bmatrix} C_p & C_p \\ C_p & -C_p \end{bmatrix} \text{ and } C_1 = [1] \qquad (9)$$

The matrix is real, symmetrical and equal to its own inverse. In addition, the sequences are orthogonal.

The elements of C can be expressed in the form: $c_{ij} = (-1)^{<ij>}$ where <i, j> is the scalar product of the binary representations of i and j:

$$\langle i, j \rangle = \sum_k i_k j_k$$

The following property is derived therefrom:

$$c_{ki}^* c_{kj} = c_{k, j \oplus j} \qquad (10)$$

where i⊕j represents the bitwise addition of the integers i and j.

This is because:

$$\sum_n i_n k_n + \sum_n j_n k_n = \sum_n (i_n + j_n)k_n = \sum_n (i \oplus j)_n k_n$$

and therefore <k,i>+<k,j>=<k,i⊕j>.

The result of (10) is that the conjugate product of two WH codes is still a WH code.

Assume now that the codes used are Fourier codes, defined by: $c_{i,k}=\exp(-j\, 2\pi\, ik/N)$. The matrix of the code is symmetrical.

$$c_{k,i}^* c_{k,j} = c_{k,j-i} \tag{11}$$

where "j−i" designates here the subtraction modulo N.

The result here too is that the combined product of two Fourier codes is still a Fourier code.

This property can be extended to a family of codes obtained by "rotation" of the previous codes (and for this reason referred to as rotated codes) as presented in the article by A. Bury et al. entitled "Diversity comparison of spreading transforms for multi-carrier spread spectrum transmission methods" published in Electronic Wireless 2000 Proceedings, Dresden, Germany. The matrix of a rotated code is defined by:

$$C^r = C \cdot D(r) \tag{12}$$

where D is a diagonal matrix defined by the vector $r=(r_0, \ldots, r_{N-1})^T$ that is to say $D=\text{Diag}(r_0, \ldots, r_{N-1})$ where $r_i=\exp(j\phi_i)$.

It is important to note that coding N symbols intended for N users by means of the matrix of a rotated code is equivalent to effecting a rotation of each of these symbols through an angle $\phi_i$ and then applying the matrix of the initial code. In other words, a rotated code of an initial code can boil down to the initial code at the cost of a rotation of the constellation for each of the users.

If the matrix C of the initial code relates to a Fourier code, then, for the rotated Fourier code:

$$c_{k,i}^{*r} c_{k,j}^r = r_i^* \cdot c_{k,i}^* \cdot r_j \cdot c_{k,j} = \exp(\phi_j - \phi_i) \cdot c_{k,j-i} = \lambda_{ij} \cdot c_{k,j-i}^r \tag{13}$$

with $\lambda_{ij} = \phi_j - \phi_i - \phi_{j-i}$

Likewise, for a rotated Hadamard code:

$$c_{k,i}^{*r} c_{k,j}^r = r_i^* \cdot c_{k,i} \cdot r_j \cdot c_{k,j} = \exp(\phi_j - \phi_i) \cdot c_{k,j \oplus i} = \lambda_{ij} c_{k,j \oplus i}^r \tag{13'}$$

with $\lambda_{ij} = \phi_j - \phi_i - \phi_{j \oplus i}$

Subsequently, the codes satisfying the following property will be considered:

$$c_{k,i}^* c_{k,j} = \lambda_{ij} \cdot c_{k,f(i,j)} \text{ or } \lambda_{ij} c_{k,f(i,j)}^* \text{ which will be denoted } \lambda_{ij} \cdot c_{k,f(i,j)}^{(*)} \tag{14}$$

where f(i,j) is an index dependent on i and j and describing 0 to N−1 with i constant or with j constant and where $\lambda_{ij}$ is a complex number in general depending on the indices i and j.

In this case the coefficients $b_{ij}$ of the matrix $B=C^H|H|^2 C$ can be expressed by:

$$b_{ij} = \sum_{k=0}^{N-1} |h_k|^2 c_{k,i}^* c_{k,j} = \lambda_{ij} \sum_{k=0}^{N-1} |h_k|^2 c_{k,f(i,j)}^{(*)} \tag{15}$$

First of all, for example, the first row of the matrix B is calculated, that is to say the coefficients $b_{0,j}$, and then the other rows are derived therefrom by permutation and multiplication:

$$b_{ij} = \frac{\lambda_{ij}}{\lambda_{o,j}} b_{0,f_0^{-1}(f(i,j))}^* \text{ where } f_0(k) = f(0,k) \tag{16}$$

If a table of $f_0^{-1} f$ and, where applicable, of $$\frac{\lambda_{ij}}{\lambda_{o,j}},$$

is available, calculation of the matrix B requires only the calculation of one of its rows. By way of example, expression (16) is written in the case of a WH code: $b_{ij}=b_{0,j \oplus i}$.

If for example use is made of a WH code, a rotated WH code, a Fourier code or a rotated Fourier code, the first row of the matrix B can advantageously be obtained by simple transform of the vector $\rho=(|h_0|^2, \ldots, |h_{N-1}|^2)^T$.

This is because, in the case of a WH code, the first row is obtained by Hadamard transform of $\rho$:

$$b_{0,j} = \sum_{k=0}^{N-1} |h_k|^2 c_{k,0} c_{k,j} = \sum_{k=0}^{N-1} |h_k|^2 c_{k,0 \oplus j} = \sum_{k=0}^{N-1} |h_k|^2 c_{k,j} = \sum_{k=0}^{N-1} c_{j,k} |h_k|^2 \tag{17}$$

and, in the case of a Fourier code, the first row is obtained by Fourier transform of $\rho$:

$$b_{0,j} = \sum_{k=0}^{N-1} |h_k|^2 c_{k,0}^* c_{k,j} = \tag{18}$$

$$\sum_{k=0}^{N-1} |h_k|^2 c_{k,j-0} = \sum_{k=0}^{N-1} |h_k|^2 c_{k,j} = \sum_{k=0}^{N-1} c_{j,k} |h_k|^2$$

Advantageously, the Fourier transform will be effected by means of an FFT.

If rotated versions of these codes are used, the coefficients of the first row of B are derived from (17) and (18) by means of a simple multiplication by complex coefficient.

In general terms, if the code employed satisfies property (14), notably for a Hadamard, rotated Hadamard, Fourier or rotated Fourier code, advantageously a row of the matrix B will be calculated (or a column since it is hermitian) and the other rows (or respectively the other columns) will be deduced therefrom by means of permutation and where necessary multiplication operations.

In a similar manner, when the code matrix C satisfies the property (14), an expression similar to (15) and (16) can be obtained for $E=C|V|^2C^H$. Calculation of the matrix E then requires merely the calculation of just one of its rows (or columns). In addition, if a WH code, a rotated WH code, a Fourier code or a rotated Fourier code is used, a row (or column) of the matrix E can be obtained by simple transformation of the vector $\pi=(|v_0|^2, \ldots, |v_{N-1}|^2)^T$ in a similar fashion to (17) and (18).

The calculation by transform (Hadamard, FFT) of a row (or column) of the matrix B or E requires N log$_2$N operations. A complete calculation of the matrix $A^H A$ by equation (7) or of the matrix $AA^H$ by equation (8) requires $N \log_2 N + 2N^2$ operations. This is to be compared with the $N^3 + 3N^2$ operations which would be required by the conventional calculation of the matrix $V^H(C^H|H|^2 C)V$ or $H(C|V|^2 C^H)H^H$.

Figure 4:
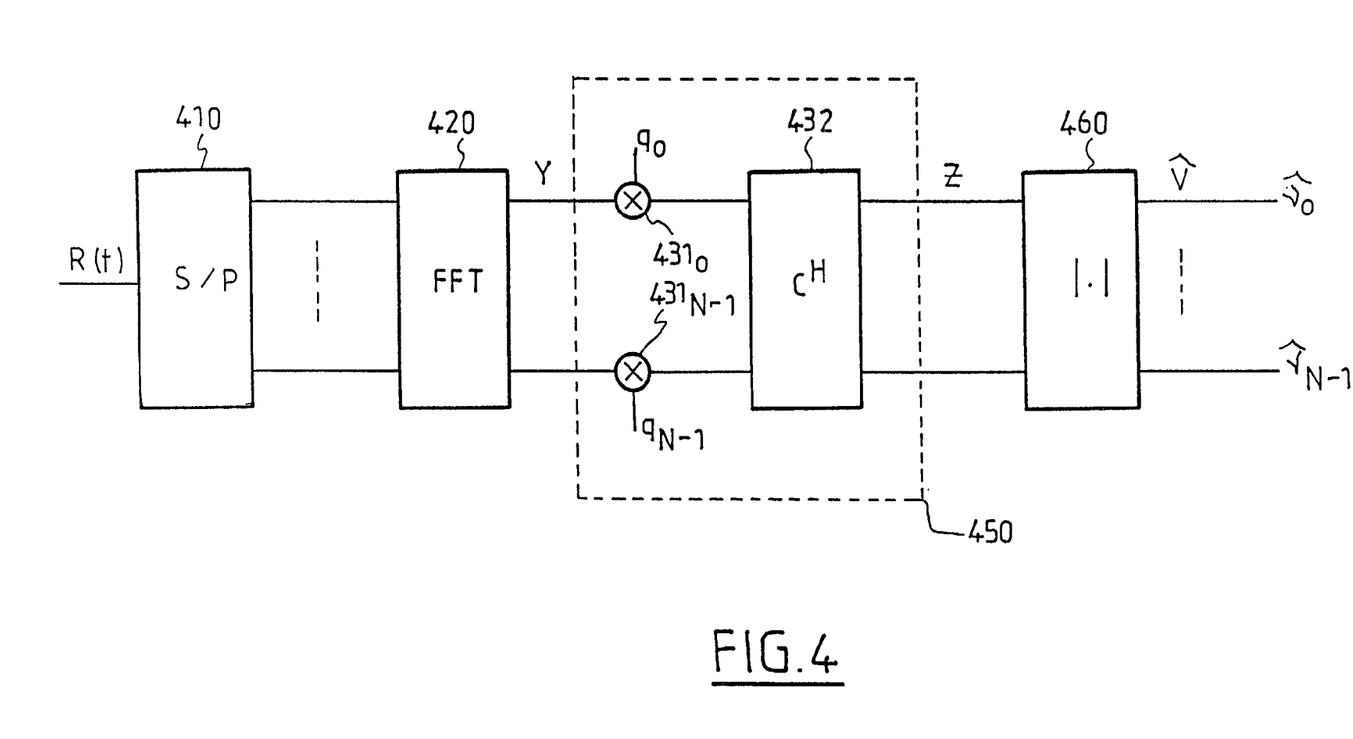
FIG. 4 depicts a transmission level evaluation module.

The transmission levels $v_0, \ldots, v_{N-1}$, appearing in the matrix V can be known from the MC-CDMA receiver. This will for example be the case if the base station transmits them to the receivers on an auxiliary channel. On the other hand, if the transmission levels are not known to the receiver, the latter can estimate them, as will be seen. This is because the single user detection disclosed above in relation to FIG. 2 makes it possible to obtain a first approximation of the relative transmission level of each user, ignoring the inter-user interference. A carrier by carrier equalisation is applied, at the output of the FFT module, as indicated in FIG. 4, by means of the multipliers $431_0, \ldots, 431_{N-1}$, and then at 432 the signals are despread by means of the sequences of the different users, in order to obtain therefrom a symbols vector $Z=(z_0, \ldots, z_{N-1})^T$, that is to say:

$$Z = C^H Q Y \tag{19}$$

where $Q=\text{Diag}(q_0, \ldots, q_{N-1})$ where the $q_i$ values are coefficients of the chosen equalisation method MRC, EGC, ZF, MMSE. The combination of the equalisation module and the despreading module is represented by 450. The operation carried out at 450 is therefore a multiplication by the matrix $C^H Q$ and its output is the vector Z.

It will be noted that, if the equalisation method adopted is the MRC method, expression (19) is also written:

$$Z = C^H H^H Y \tag{20}$$

An estimation is obtained of the relative transmission levels in the module 460 in the form of a vector $\hat{v} = (\hat{v}_0, \ldots, \hat{v}_{N-1})^T$ such that:

$$\hat{v}_i = z_i| \tag{21}$$

if the interference and noise are ignored, and $$\hat{v}_i = \sqrt{|z_i|^2 - \hat{\lambda}^2} \tag{22}$$

if an estimation $\hat{\lambda}^2$ of the power of the interference and noise is available.

Advantageously, if several MC-CDMA symbols belong to the same block transmitted with the same code and at the same power, the module 460 can effect a smoothing of the values $\hat{v}_i$ or $\hat{v}_i^2$ by means of an FIR or IIR filter. In the latter case, no additional latency is introduced by the smoothing. If the output of the filter at time n is denoted $\tilde{v}_i(n)$:

$$\tilde{v}_i(n) = \alpha \tilde{v}_i(n-1) + \beta \hat{v}_i(n) \tag{23}$$

and where $\alpha$ and $\beta$ are the coefficients of the filter. For example, $\alpha=0.9$ and $\beta=1-\alpha$ will be taken.

In all cases, once the relative transmission levels have been evaluated, it is possible to estimate the matrix A by:

$$A = HC\hat{V} \text{ and therefore } A^H = \hat{V}^H C^H H^H \tag{24}$$

where $\hat{V}=\text{Diag}(\hat{v}_0, \ldots, \hat{v}_{N-1})$. In addition, the matrix $AA^H$ is estimated by $\hat{V}(C|H|^2 C^H)\hat{V}^H$ (or respectively $A^H A$ by $H(C|\hat{V}|^2 C^H)H^H$) and $\hat{D}$ is derived therefrom by means of equation (5) or (6).

Advantageously, the detection will be effected by means of formula (6) and use will be made of the MRC equalisation method given by (20) in the preliminary single user detection step. Thus the result of the carrier by carrier equalisation can be reused in the GMMSE equalisation. This is because equation (6) can also be written:

$$\hat{D} = (A^H A = \sigma_b^2.I_N)^{-1} A^H Y = (A^H A = \sigma_b^2.I_N)^{-1}$$
$$\hat{V}^H C^H H^H Y = (A^H A = \sigma_b^2.I_N)^{-1} \hat{V}^H Z \tag{25}$$

It is now assumed that the transmission levels $v_0, \ldots, v_{N-1}$ are known, and that they have been transmitted to the receiver or estimated by it by means of one of formulae (21) to (23) as has just been seen.

According to an advantageous embodiment of the invention, in the calculation of (5) or (6) only the codes actually used (that is to say for the users present) are taken into account and, amongst these, for a given user, only those significantly interfering with the code of this user.

The most interfering codes can then be determined according to one of the following criteria:

(1) the P−1 (P a given integer such that P<N) codes $c_m$ distinct from $c_k$ associated with the highest levels $v_m$ are selected;

(2) the codes $c_m$ distinct from $c_k$ associated with the levels $v_m > \text{Th}$ where Th is a predetermined threshold, are selected. Advantageously, the threshold Th will be adaptive and will depend on the transmission level for the user in question. Then the codes $c_m$ will be selected such that: $v_m > \mu . v_k$ with, for example, $0 < \mu < 1$. If the receiver of the user k uses several codes of indices $k_1, \ldots, k_A$, that is to say if the user has established several links with the base station (the channel of a user then consists of several links), account will be taken of the code of index $k_\delta \in \{k_1, \ldots, k_A\}$ associated with the lowest level $\hat{v}_{k\delta}$ and the codes $c_m$ will be selected such that: $v_m > \mu . v_{k\delta}$. According to a variant, the absolute threshold Th or the relative threshold $\mu$ can be chosen according to the values of N (the length of the sequences) and P (the number of codes used), for example as a function of the ratio P/N, that is to say the degree of use of the resource, on which the interference after demodulation depends.

Naturally, a combination of the above criteria can also be envisaged. In addition, in addition to the selection from the transmission levels, it is possible to select, from amongst those adopted according to this criterion, only the most intrinsically jamming codes (that is to say excluding any consideration of transmission level) for the code in question. This is because it is known, for example from the article by D. Mottier and D. Castelain entitled 'A spreading sequence allocation procedure for MC-CDMA transmission systems', published in VTC' Fall 2000, September 2000 and included here by reference, that, if the coefficients $h_k$ of the channel are correlated, for a given user code, certain codes, for equal transmission levels, are more jamming than others. More precisely, the interference between two codes $c_i$ and $c_j$ is related to the properties of the "conjugate product" sequence $w_{ij}$, defined by $w_{ij}[k] = c_i[k]c_j^*[k]$. This selection criterion will be referred to as the intrinsic jamming criterion.

With each code $c_i$ there is associated a set $E_i$ of codes judged to be "non-critical", that is to say with a low interference level. The size of these sets depends on the level of interference accepted. It will be assumed that each set $E_i$ contains M elements.

According to one advantageous embodiment, the sets $E_i$ are stored in a bidimensional table: a first input corresponds to the index i of the code in question; a second input corresponds to the rank k (k between 0 and M−1) of the "non-critical" code. The output of the table gives the indices j of the codes, which is expressed by:

$$j = \text{tab}[ik] \tag{26}$$

In the case of the WH sequences, a table with one dimension suffices: it is possible to store only the sequences associated with the 0 sequence. This is because $w_{ij}[k]=c_{i\oplus j}[k]=w_{0,i\oplus j}$ (the sequence produced corresponds to a code), if the term ℘ is given to the property related to the sequence produced making it possible to distinguish a code which has an intrinsically low jamming level:

$E_i=\{j$, such that $w_{ij}=c_i c_j^*$ satisfies the property ℘$\}$ $\Rightarrow E_i=\{j$, such that $w_{0,i\oplus j}=c_0 c_{i\oplus j}$ satisfies the property ℘$\}$ $\Rightarrow E_i=\{k\oplus i;\ w_{0,k}=c_0 c_k^*$ satisfies the property ℘$\}$ $\Rightarrow E_i=\{k\oplus i;\ k\in E_0\}=i\oplus E_0$ It is therefore possible to generate the indices of the associated codes of E1 from those of $E_0$ by $$j=i\oplus tab[0,k] \qquad (27)$$

This property can be extended to any code satisfying property (14). Equation (26) then becomes:

$$j=f_i^{-1}(tab[0,f_0(k)])\ \text{where}\ f_i(j)=f(i,j) \qquad (28)$$

In particular, this property also applies to a rotated Hadamard code, to a Fourier code or to a rotated Fourier code.

The intrinsic jamming criterion consists, for a given user k, of eliminating the codes relating to the indices belonging to $E_k$ and selecting the codes relating to the remaining indices.

It should be noted that the selection according to the intrinsic jamming criterion may take place before or after the selection according to the transmission level criterion.

As will be seen, the selection of the codes according to the transmission level criterion, in possible combination with the intrinsic jamming criterion, makes it possible both to improve performance and to reduce the complexity by decreasing the size of the matrices.

Concerning the improvement to performance, it will be noted in fact that, when the levels $v_i$ are estimated, the non-used codes can correspond to values of $v_i$ which are low, but non-zero, which may interfere with the decoding. On the other hand, if a code used whose transmitted level is low is eliminated, the performance will thereby be only very slightly degraded.

Concerning the reduction in size of the matrices, if P codes have finally been selected, it is possible to construct a matrix V' of size P×P obtained from V by eliminating the elements relating to the non-selected codes. It can be assumed, without loss of generality, that these codes bear the indices $0, \ldots P-1$, and hence $V'=Diag(v_0, \ldots, v_{P-1})$. The matrix C can also be reduced to a matrix C' of size N×P containing only the codes used. In this case, the matrix A, the product of the matrices H,C and V, is also reduced to a matrix A' of size N×P: A'=HC'V', and the vector Y is written: Y=A'D'+b.

The estimation of the symbols transmitted for the different users will then advantageously be done using the reduced equations, corresponding respectively to (5) and (6):

$$\hat{D}'=A'^H(A'A'^H=\sigma_b^2.I_N)^{-1}Y \qquad (29)$$

$$\hat{D}'=(A'^H A'=\sigma_b^2.I_P)^{-1}A'^H Y \qquad (30)$$

It will be noted that equation (29) involves the matrix $A'A'^H$ of size N×N whilst equation (30) involves the matrix $A'^H A'$ of reduced size P×P. Therefore preferably an estimation of the symbols according to equation (30) will be used.

In addition, if an estimation of the transmission levels is carried out by means of a single user equalisation of the MRC type, as disclosed above, the vector $Z=C^H H^H Y$ defined at (20) is already available and it is consequently possible to create a vector of reduced size Z' containing only the components corresponding to the selected codes, here by assumption the first P components. The symbols are then estimated in a manner similar to (25):

$$\hat{D}'=(A'^H A'=\sigma_b^2.I_P)^{-1}\hat{V}'^H Z' \qquad (31)$$

It is possible to rewrite the expression of $A'^H A'$ appearing in (30) (or in (31)) if an estimation of the transmission levels has been carried out) by observing that A' can also be expressed in the form A'=(HC)'V' where (HC)' is the reduction of the matrix HC to its first P columns:

$$A'^H A'=V'^H(C^H|H|^2 C)'V'=V'^H B'V' \qquad (32)$$

It should be noted that, according to this expression, first of all $B=C^H|H|^2 C$ is calculated on the complete matrix C before proceeding with a reduction in dimension.

It should be stated that the codes of the matrix C satisfy property (14), it suffices to calculate a row (or column) of B, the other rows (or columns) being derived therefrom using a permutation of these elements. In addition, if the matrix C is the matrix of a Fourier, rotated Fourier, Hadamard or rotated Hadamard code, the calculation of a row (or column) of B is easily obtained by transformation of the vector ρ.

Figure 5:
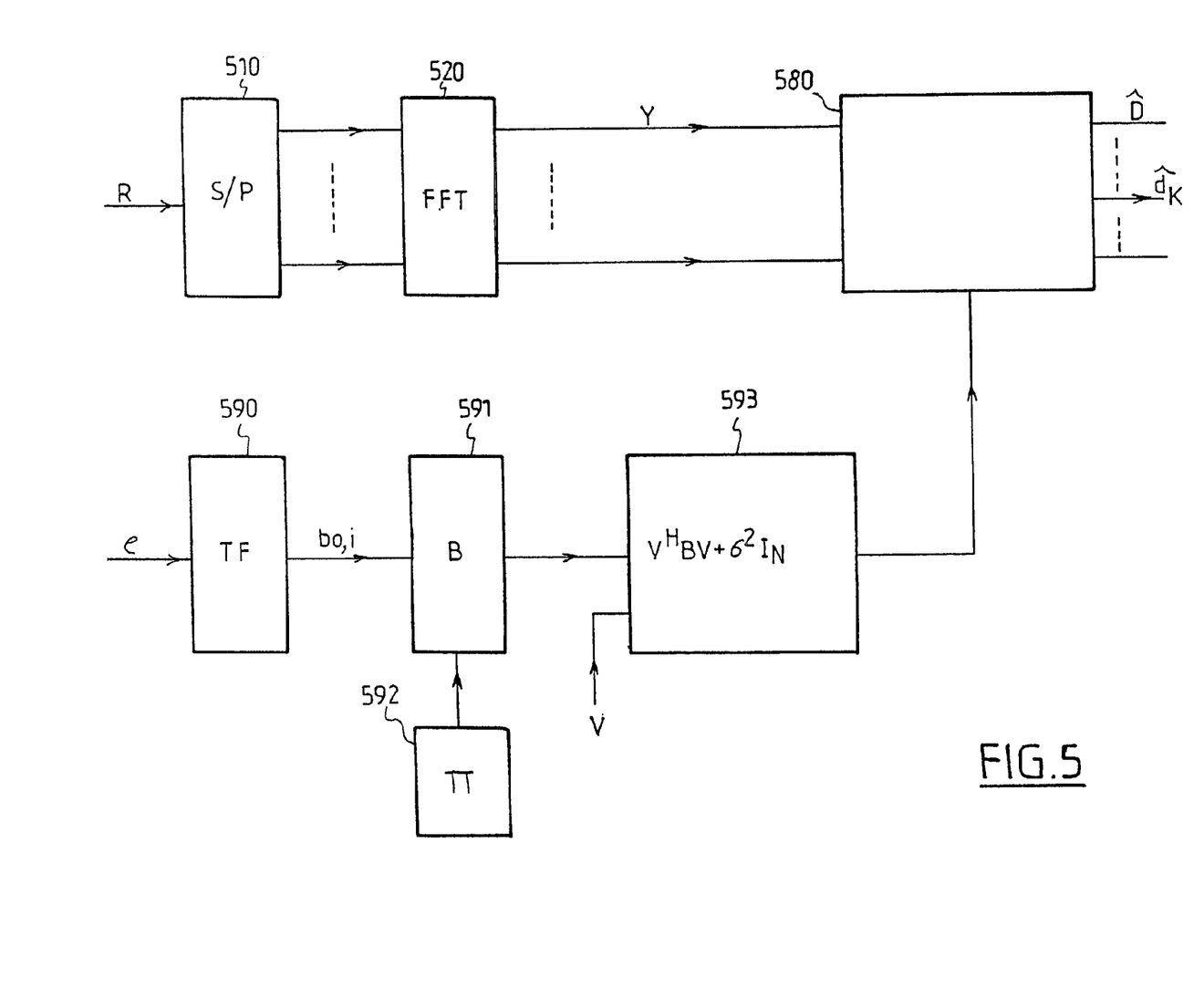
FIG. 5 depicts schematically an equalisation device according to a first embodiment of the invention.

FIG. 5 illustrates a GMMSE equaliser according to a first embodiment of the invention.

The modules 510, 520 can be seen, identical to the modules 410 and 420 of FIG. 4. The output of the FFT module 520 is the vector Y. The vector ρ issuing from a channel estimator is subjected at 590 to a transform (Hadamard, Fourier) corresponding to the code used for supplying the first row of the matrix B. From a table 592 giving the permutation of the indices $f_0^{-1}f$, the module 591 generates, by means of (16), other rows of the matrix B. A matrix calculation module 593 receives the transmission levels $v=(v_0, \ldots, v_{N-1})^T$ and calculates the matrix $\Omega=V_H BV+\sigma_b^2.I_N$ (equation 6). The module 580 resolves the linear system $\Omega\hat{D}=A^H Y$ where the values of $\hat{d}_k$ are the unknowns.

According to a variant embodiment, not shown, the module 590 receives the vector π obtained from the received or estimated transmission level values. The module 590 effects a transform (Hadamard, Fourier) corresponding to the code used for supplying the first row of the matrix E. The module 591 next generates the other rows of the matrix E by means of the permutation table 592. The matrix $\Lambda=HEH_H+\sigma_b^2.I_N$ is calculated in the module 593 and then transmitted to the module 580 which, in this case, calculates $\hat{D}=A^H\Lambda^{-1}Y$. According to this variant the module 593 does not receive the vector v.

Figure 6:
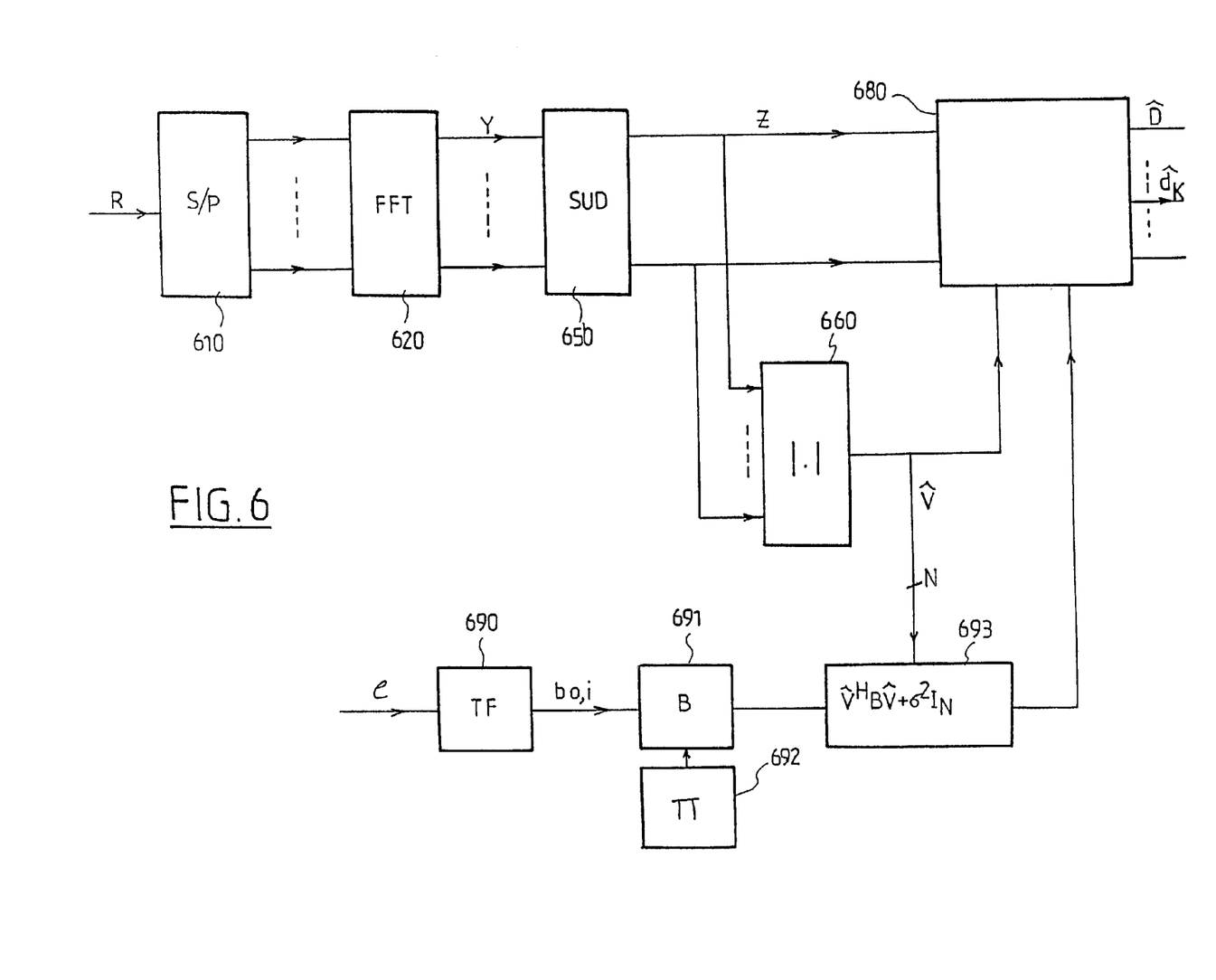
FIG. 6 depicts schematically an equalisation device according to a second embodiment of the invention.

FIG. 6 illustrates a GMMSE equaliser according to a second embodiment of the invention with the estimation of the transmission levels but without reduction in dimension by selection of codes.

The modules 610, 620, 650, 660 can be seen, identical to the modules 410, 420, 450 and 460 in FIG. 4. The module 660 supplies an evaluation of the transmission levels $v=(\hat{v}_0, \ldots, \hat{v}_{N-1})^T$ from the output Z of the single user detection module (650). The module 650 uses an equalisation of the MRC type. The modules 690, 691, 692 are identical to the modules 590, 591, 592. The matrix calculation module receives from the module 691 the matrix B and the vector $\hat{v}$ of the estimated transmission levels and effects the matrix calculation $\Omega=\hat{V}^H B\hat{V}+\sigma_b^2.I_N$. The module 680 resolves the linear system $\Omega\hat{D}=A^H Y$ where the values of $\hat{d}_k$ are the unknowns.

According to a variant embodiment, not shown, the estimation module 660 does not transmit the vector $\hat{v}$ of the estimated transmission levels to the module 693. On the other hand, the vector $\pi$ is calculated from the components of $\hat{v}$ and then supplied to the module 690. The latter applies to it the transform corresponding to the code, which makes it possible to obtain, for example, the first row of the matrix $\hat{E}=C|\hat{V}|^2C^H$. The other rows of the matrix are next generated by 691 from the permutation table 692. The matrix $\hat{\Lambda}=H\hat{E}H^H+\sigma_b^2.I_N$ is calculated in the module 693 and then transmitted to the module 680 which, in this case, calculates $\hat{D}=A^H\hat{\Lambda}^{-1}Y$.

Figure 7:
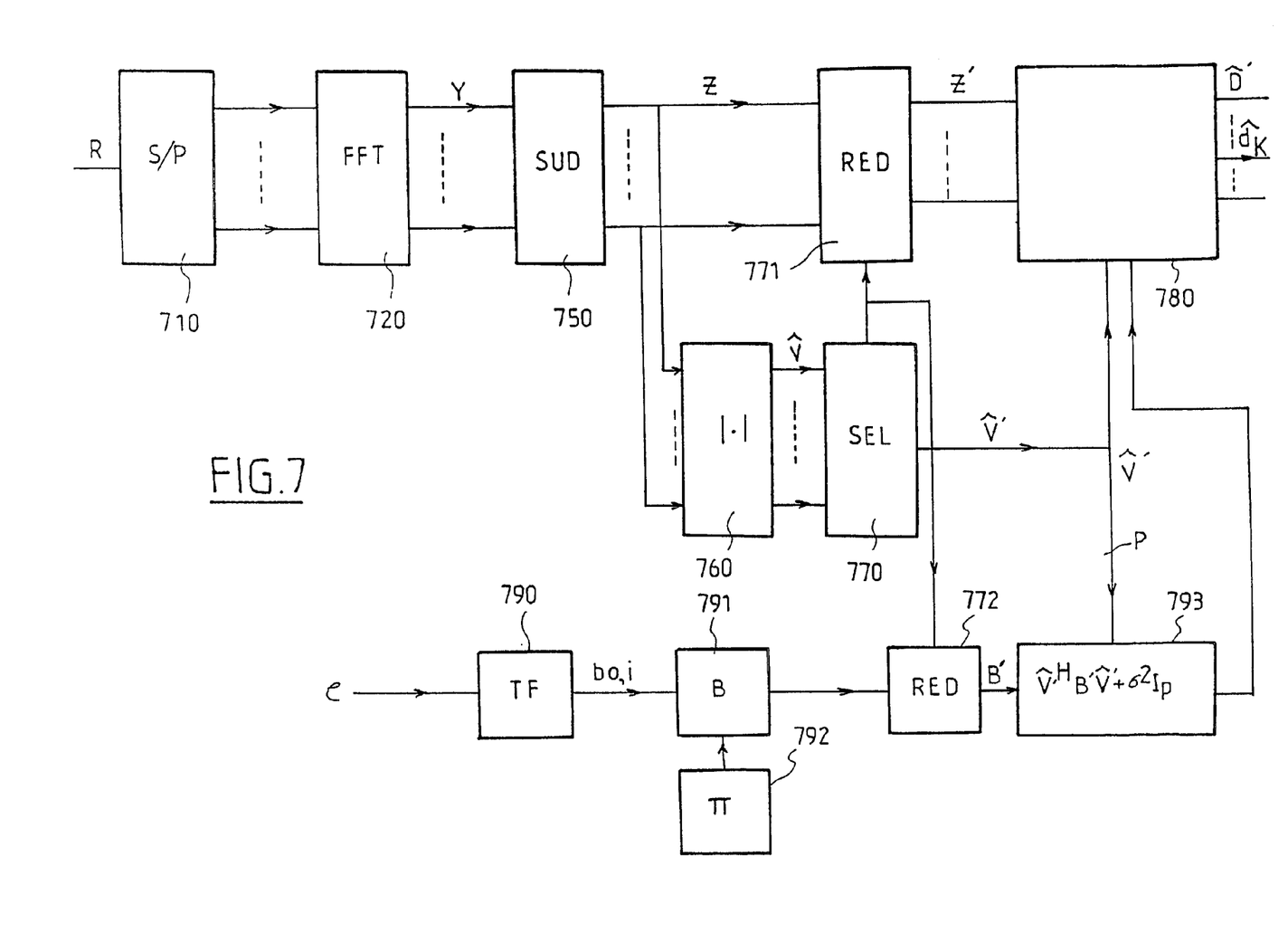
FIG. 7 depicts schematically an equalisation device according to a third embodiment of the invention.

FIG. 7 illustrates a GMMSE equaliser according to a third embodiment of the invention, effecting an evaluation of the transmission levels and a reduction in dimension by selection of codes. The modules 710, 720, 750, 760 are identical to the modules 410, 420, 450 and 460 in FIG. 4. The modules 790, 791 and 792 are identical to the modules 690, 691 and 692 in FIG. 6. From the evaluation of the transmission levels $\hat{v}=(\hat{v}_0, \ldots, \hat{v}_{N-1})^T$ effected by the module 760, the module 770 selects the indice of the codes with the highest interference level and transmits them to the modules 771 and 772. The module 771 constructs the vector Z' from the vector Z. retaining only the components relating to the selected indices. Likewise, the module 772 reduces the matrix B of size N×N to the matrix B' of size P×P, retaining only the rows and columns relating to the selected indices. The selection module 770 also transmits, to the matrix calculation module 793 and to the module 780, the P transmission levels selected $\hat{v}'=(\hat{v}_0, \ldots, \hat{v}_{P-1})^T$. The latter effects the calculation $\Omega=V'^HB'V'+\sigma_b^2.I_P$ and transmits it to 780, which resolves the linear system $\Omega'\hat{D}'=\hat{V}'^HZ'$ where the values of $\hat{d}_k$ are the unknowns.

Although the MC-CDMA reception device using the equalisation method according to the invention has been depicted in the form of functional modules, it goes without saying that all or part of this device can be implemented by means of a single processor, either dedicated or programmed to fulfil all the functions described or in the form of a plurality of processors either dedicated or programmed for each fulfilling some of the said functions.

Annexe:

Let Y=AD+b be an observable from which it is possible to estimate the vector D by Wiener filtering. A is a square matrix of size N×N. The vector $\hat{D}$ of the estimated symbols for the different users is obtained by means of the Wiener-Hopf equation:

$$\hat{D}=R_{DY}R_{YY}^{-1}Y=(R_{DD}A^H)(AR_{DD}A^H+\sigma_b^2.I_N)^{-1}Y$$

where $R_{DY}$, $R_{YY}$, $R_{DD}$ are respectively the covariance matrix of Y and D and the autoco variance matrices of Y and D. If it is assumed that the transmitted symbols are decorrelated, this gives $R_{DD}=I_N$ and therefore:

$$\hat{D}=A^H(AA^H=\sigma_b^2.I_N)^{-1}Y$$

Let $X=A^HY$, the result of the matched filtering of Y: it is known that X is an exhaustive summary of Y. It is possible to take as an observable the vector X instead of the vector Y and estimate the vector D from this new observable by means of a Wiener filtering. The estimated vector $\hat{D}$ is then written:

$$\hat{D}=R_{DX}^*R_{XX}^{-1}X$$

However $R_{DX}=E(DX^H)=E(DY^HA)=(R_{DD}A^H+R_{Db})$
$A=A^HA$ and likewise $$R_{XX}=A^HAR_{DD}A^HA+A^HR_{bb}A=(AA^H=\sigma_b^2I_N)A^HA \text{ and hence}$$

$$\hat{D}=(A^HA=\sigma_b^2I_N)^{-1}X=(A^HA+\sigma_b^2I_N)^{-1}A^HY$$

If the square matrix A is replaced by a rectangular matrix A' of size N×P, there is obtained, in the same way:

$$\hat{D}=(A'^HA'+\sigma_b^2I_P)^{-1}X=(A'^HA'+\sigma_b^2I_P)^{-1}A'^HY$$

The invention claimed is:

1. An equalization method for a downlink channel in a telecommunication system transmitting MC-CDMA symbols on a plurality of carrier frequencies, in which a plurality of links are established between a transmitter and a plurality of receivers in order to transmit a plurality of coded signals, each link using a distinct access code amongst N possible codes, a conjugate product of two possible codes being proportional to a possible code or to its conjugate wherein, for at least one receiver, said method comprises the steps of calculating a matrix (B, E) characteristic of said plurality of links, said step of calculating comprising calculating first the elements of a row or a column in a characteristic matrix and deducing other rows or other columns with a permutation of said elements; multiplying a received symbol with the matrix; and determining an estimated symbol based on the result of the multiplying step.

2. The equalization method according to claim 1, wherein the characteristic matrix is a product $E=C|V|^2C^H$ where C is a matrix of possible codes, $C^H$ is a conjugate transpose of C, $V=\text{Diag}(v_0, \ldots, v_{N-1})$ where the coefficients $v_i$ are transmission levels, real or estimated, of signals coded by said N possible codes.

3. The equalization method according to claim 2, further comprising a second step of calculating a matrix $\Lambda=HEH^H+\sigma_b^2.I_N$ where $I_N$ is a unity matrix of size N×N, $\sigma_b^2$ is a variance of a noise, $H=\text{Diag}(h_0, \ldots, h_{N-1})$ where coefficients $h_i$ characterise a response of the transmission channel, between said transmitter and said receiver, to different carrier frequencies.

4. The equalization method according to claim 3, further comprising a third step of calculating $\hat{D}=A^H\Lambda^{-1}Y$ where $\hat{D}$ is a vector of estimated symbols on different links, A=HCV, Y is a received vector of components of an MC-CDMA symbol on the different carrier frequencies.

5. The equalization method according to claim 2, wherein the elements $c_{k,i}$ of the matrix C of the possible codes satisfy an equation $c_{k,i}^*c_{k,j}=\lambda_{ij}.c_{k,f(i,j)}$ or $\lambda_{ij}.c_{k,f(i,j)}^*$, where F(i,j) is an index between 0 and N−1 dependent on i and j and $\lambda_{ij}$ is a complex number.

6. The equalization method according to claim 2, wherein the matrix C of possible codes being a matrix of a Hadamard or rotated Hadamard code and, there is calculated (590, 690, 70) a row or column of the characteristic matrix by means of a Hadamard transform.

7. The equalization method according to claims 2, wherein the matrix C of possible codes being a matrix of a Fourier code or rotated Fourier code and, there is calculated (590, 690, 70) a row or column of the characteristic matrix by means of an FFT.

8. The equalization method according to claim 1, wherein the characteristic matrix is a product $B=C^H|H|^2C$ where C is a matrix of possible codes, $C^H$ is a conjugate transpose of C, $H=\text{Diag}(h_0, \ldots, h_{N-1})$ where the coefficients $h_i$ characterise a response of the channel, between said transmitter and said receiver, at different carrier frequencies.

9. The equalization method according to claim 8, further comprising a second step of calculating a matrix $\Omega=V^HBV+$ $\sigma_b^2 . I_N$ where $I_N$ is a unity matrix of size N×N, $\sigma_b^2$ is a variance of the noise, $V=Diag(v_0, \ldots, v_{N-1})$ where the coefficients $v_i$ are transmission levels, real or estimated, of signals coded by said N possible codes.

10. The equalization method according to claim 9, further comprising a third step of resolving a system of linear equations $\Omega \hat{D} = A^H Y$ where A=HCV, Y is a received vector of components of an MC-CDMA symbol on different carrier frequencies and where $\hat{D}$ is a vector of estimated symbols on different links.

11. The equalization method according to claim 8, further comprising selecting (670, 770), from transmission levels, real or estimated, of signals coded by said N possible codes, a subset of codes amongst the N possible codes.

12. The equalization method according to claim 11, wherein P codes amongst N having been selected, a matrix $V=Diag(v_0, \ldots, v_{N-1})$, where the $v_i$ values are estimated or real levels, is reduced to a matrix V' of size P×P containing only levels associated with said selected codes and the step of calculating the characteristic matrix is followed by a second step of calculating a matrix $\Omega = V'^H B' V' + \sigma_b^2 . I_P$ where B' is a matrix of size P×P obtained by reducing B to the P rows and P columns corresponding to the selected codes, $\sigma_b^2$ is a variance of noise on each carrier and $I_P$ a unity matrix of size P×P.

13. The equalization method according to claim 12, further comprising a third step (780) of resolving a system of linear equations $\Omega' \hat{D}' = V'^H Z'$ where Z' is a reduction of a vector Z to the P components corresponding to the selected codes where Z is a result of a carrier by carrier equalization and where $\hat{D}'$ is a vector of estimated symbols on different links using the said selected codes.

14. The equalization method according to claim 1, said method contains a step (650, 750) comprising an equalization of the MC-CDMA symbols over different carrier frequencies and a filtering matched to each of the N possible codes.

15. The equalization method according to claim 14, wherein transmission levels of the signals coded by said N possible codes are estimated by effecting a modulus calculation (660, 760) at an output of said matched filtering.

16. An equalization device for a receiver in a telecommunication system of the MC-CDMA type, comprising means for implementing the equalization method according to claim 1.

17. A receiver for a telecommunication system of the MC-CDMA type, comprising an equalization device according to claim 16.

* * * * *